(12) United States Patent
Callen

(10) Patent No.: US 8,051,277 B1
(45) Date of Patent: Nov. 1, 2011

(54) PROGRAMMABLE ARITHMETIC LOGIC UNIT CLUSTER

(76) Inventor: Greg S. Callen, Anaheim, CA (US)

( * ) Notice: Subject to any disclaimer, the term of this patent is extended or adjusted under 35 U.S.C. 154(b) by 0 days.

(21) Appl. No.: 12/903,167

(22) Filed: Oct. 12, 2010

Related U.S. Application Data

(63) Continuation of application No. 12/004,629, filed on Dec. 22, 2007, now abandoned.

(51) Int. Cl.
  *G06F 15/76* (2006.01)
  *G06F 9/302* (2006.01)
  *G06F 17/50* (2006.01)
(52) U.S. Cl. ............................ 712/220; 712/16; 716/116
(58) Field of Classification Search ................... 712/16, 712/220; 716/116
  See application file for complete search history.

(56) References Cited

U.S. PATENT DOCUMENTS

| | | | | |
|---|---|---|---|---|
| 6,286,101 B1 * | 9/2001 | Suzuki | ............................ | 726/34 |
| 6,574,761 B1 * | 6/2003 | Abramovici et al. | ......... | 714/725 |
| 2002/0083308 A1 * | 6/2002 | De Oliveira Kastrup Pereira et al. | .............................. | 712/226 |
| 2003/0005402 A1 * | 1/2003 | Bal | ................. | 716/16 |
| 2004/0178818 A1 * | 9/2004 | Crotty et al. | .................... | 326/40 |

* cited by examiner

*Primary Examiner* — Daniel Pan
(74) *Attorney, Agent, or Firm* — Wang, Hartmann, Gibbs & Cauley, PLC; John O'Rourke

(57) ABSTRACT

A Programmable Arithmetic Logic Unit Cluster is claimed. The plurality of Programmable Logic Blocks (50) in the cluster are in a physically linear sequence; but, will process data in parallel when the data pathways permit. A physically linear and operationally parallel design is possible mainly due to an Internal Register Bus (30). A small subset of data from the Internal Register Bus (30) is modified by each Arithmetic Logic Unit (53). The greater chunk of information of the Internal Register Bus (30) passes, without changes made to the data, through a plurality of two-to-one-multiplexers (54) as data inputs, bypassing the Data Selection (52) and Arithmetic Logic Unit's (53) circuitry. Only the data specified as the Accumulator (41) and Carry History (31) are modified by the blocks (50). The Accumulator (41) and the Carry Output Line (44) are distributed back onto the Internal Register Bus (30) for subsequent blocks or for the Output Register File (79) by said two-to-one-multiplexers (54).

13 Claims, 3 Drawing Sheets

PROGRAMMABLE ARITHMETIC LOGIC UNIT CLUSTER

FIELD OF INVENTION

This invention relates to digital data processing, specifically to a programmatically linear, operationally parallel, array of programmable arithmetic logic units.

BACKGROUND OF THE INVENTION

Implementation of complex, high level, data processing can be accomplished by a number of methods utilizing one or more integrated circuits. One such method involves the use of a General Purpose Microprocessor. A different method involves the use of an Application Specific Integrated Circuit. Another method involves the use of a Digital Signal Processor. Yet another method involves using a Field Programmable Gate Array. One more method involves a Field Programmable Object Array.

The use of a General Purpose Microprocessor is problematic in that processing complex equations is most often slower then all other methods. This is due to the fact, a General Purpose Microprocessor must do many tasks in supplement to processing the data. A modem General Purpose Microprocessor must fetch data and instructions, update information in many levels of cache, and branch predict. The modern General Purpose Microprocessor must account for a program pointer that can jump to almost anywhere in a program at the whim of any instruction in the processing cue. Doubling the math cores on the same chip will exponentially complicate the electronics necessary to have the General Purpose Microprocessor function correctly.

The use of an Application Specific Integrated Circuit is problematic in that advances in technology can result in the Application Specific Integrated Circuit becoming obsolete. The Application Specific Integrated Circuit's process cannot be changed. An obsolete Application Specific Integrated Circuit must be replaced or continue processing data with a less efficient design then the current technology has to offer. Application Specific Integrated Circuit's are often used for Compression Decompression Algorithms in digital video, digital audio, and digital transceivers. Most Compression Decompression Algorithm technologies change frequently; making an old Application Specific Integrated Circuit nearly useless.

A Digital Signal Processor is best suited for fixed point calculations. Although, fixed point calculations are faster than floating point calculations; this method is unsuitable for applications where high precision is necessary. Digital Signal Processors often have Digital Analog Conversion which must be calibrated for the specific signal range. Analog devices can change their range in different operating conditions, making the Digital Signal Processor's precision lower still.

The use of Field Programmable Gate Arrays is problematic in that the number of connections and configurations is so high, this slows the function of the device significantly. A Field Programmable Gate Array has many interconnected parts that may not support the application. Clock signals, multiply cores, design certification, and memory cells can all be unnecessary for the application at hand. This situation relegates Field Programmable Gate Arrays to mainly applications involving circuit design.

Field Programmable Object Arrays are problematic in that their design requires too many transistors. Common Arithmetic Logic Units used in Field Programmable Object Arrays have, in many instances, fewer then thirty functions. Tens of thousands of transistors are needed, in conventional arithmetic logic unit design, to implement those functions. The bus architecture has many switching elements, also using many transistors. As a specific data set is switched through the system, power and time is used up. Even the tiniest transistors use power and produce heat. Too much heat can damage the system.

Thus there is a continuing need to develop new integrated circuits which are cool running, adaptable, precise, simple, and fast.

SUMMARY

Brief Description of the Drawings

The invention is generally shown by way of reference to the accompanying drawings in which.

Various objects, features, aspects, and advantages of the programmable logic block embodiments will become more apparent from the following detailed description in which like numerals represent like components.

DETAILED DESCRIPTION OF THE EMBODIMENTS

Figure 1:
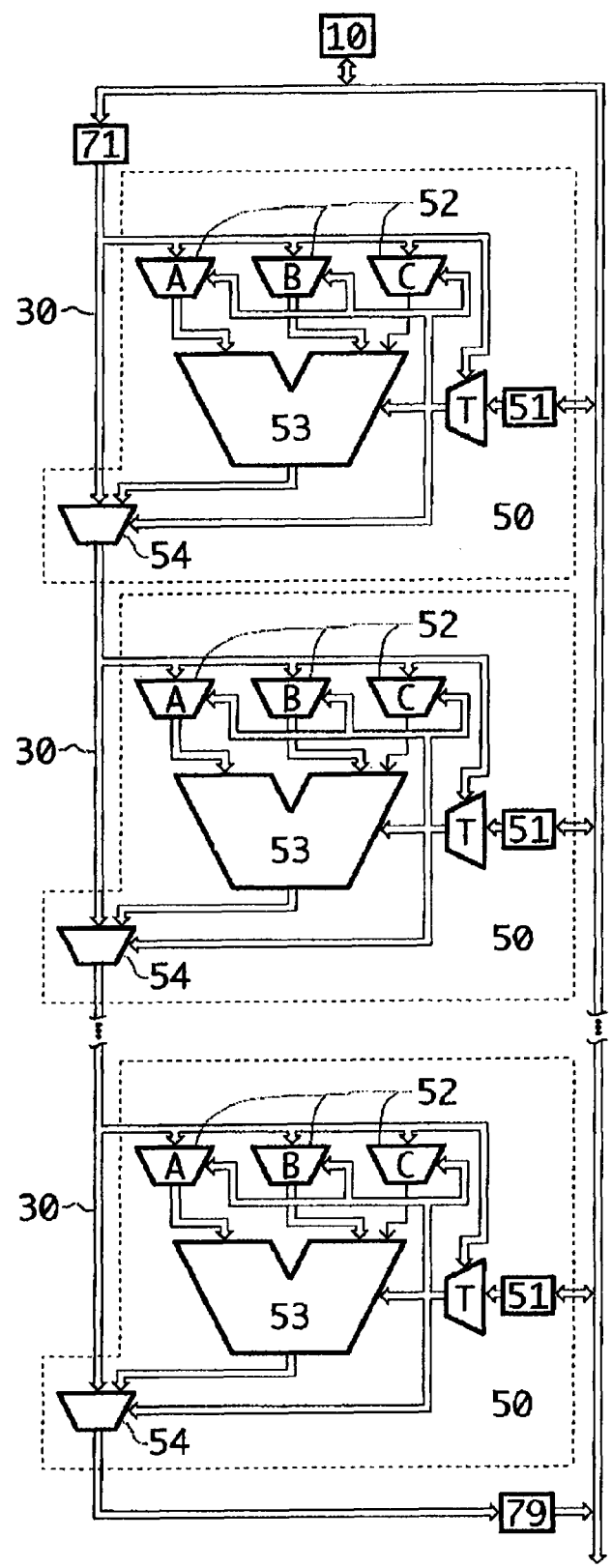
FIG. 1 is a logic diagram of an example embodiment of a programmable logic block array, in accordance with the teachings of the present invention.

Accordingly, several objects and advantages of my invention, a Programmable Arithmetic Logic Unit Cluster, are as follows:

The Programmable Arithmetic Logic Unit Cluster is fast because the present invention has no program pointer. With the Programmable Arithmetic Logic Unit Cluster the Sequence of instructions is known before processing. Instructions of the present invention are sequenced into the path of the data. Loops are processed by repeating instructions. Simple function switching can be processed with a conditional instruction. Complex branching processes are accomplished by changing the Instruction Storage Thread (32). There is no need to update or store data of an unfinished process. After the process has finished, the resulting data is latched in the Output Register File (79). Doubling the number of blocks on the same chip only doubles the electronics needed to have the Programmable Arithmetic Logic Unit Cluster function correctly.

As technology advances the present invention is still useful and efficient. The instructions assigned to the Programmable Logic Blocks (50) can be changed. The Programmable Arithmetic Logic Unit Cluster need not be replaced, just reprogrammed. As compression decompression algorithms advance in their design, the Programmable Arithmetic Logic Unit Cluster's program can be matched to the new compression decompression algorithm. If as a single thread of the present invention is too slow, the Programmable Arithmetic Logic Unit Cluster can be programmed to process with multiple threads until the Programmable Arithmetic Logic Unit Cluster is fast enough.

The present invention is not limited by the size of a single register. Floating-point functions can be processed out to the width of all the registers combined. In an application where high precision is necessary the Programmable Arithmetic Logic Unit Cluster can manage the process suitably. If a single register is not enough precision the data can be put into two, three, or even four registers.

The Programmable Arithmetic Logic Unit Cluster is programmed in the way a General Purpose Microprocessor is programmed. Many software engineers can easily learn the language necessary to program this device. The present invention has a versatile instruction set, having interchangeable units and interchangeable functionality. Also the Programmable Arithmetic Logic Unit Cluster processes information using a best speed data flow model. The Programmable Logic Blocks (50) test their power consumption. When the current falls below a predetermined level and is no longer sluing the block's function has finished. When all of the block's indicate their process has finished, the full algorithm is complete, as defined by the Instruction Storage (51) for the given input data.

The architecture for the present invention is simple. Input data is assembled onto an Internal Register Bus (30). Each Programmable Logic Block (50) selects data from the Internal Register Bus (30). The selected data is processed by the corresponding Arithmetic Logic Unit (53). The processed data is put back onto the Internal Register Bus (30) for subsequent Programmable Logic Blocks (50) and final output. This process happens for all the blocks in the cluster. After all the blocks in the cluster have finished processing, the data on the Internal Register Bus (30) is collected and latched into the Output Register File (79).

A simple design lends to fewer transistors. Fewer transistors lend to a cooler running data processor. A cooler data processor can be driven faster. A faster data processor is the goal of digital electronics and will be long into the future.

The Programmable Arithmetic Logic Unit Cluster is structurally a linear array of Programmable Logic Blocks (50) as shown in FIG. 1. Although, the blocks are in a linear sequence; the data pathways can bypass the Data Selection (52) and the Arithmetic Logic Unit (53) circuitry. Having the Internal Register Bus (30) routed around much of the circuitry allows independent data to be processed by independent blocks in parallel.

The Programmable Logic Blocks (50) of FIG. 1, are sequenced via the Internal Register Bus (30). This bus contains all of the current register data for the blocks. Each Programmable Logic Block (50) only modifies a fractional part of the data from the Internal Register Bus (30). All of the actions made by the blocks are dictated by the selected instruction from the Instruction Storage (51).

Figure 3:
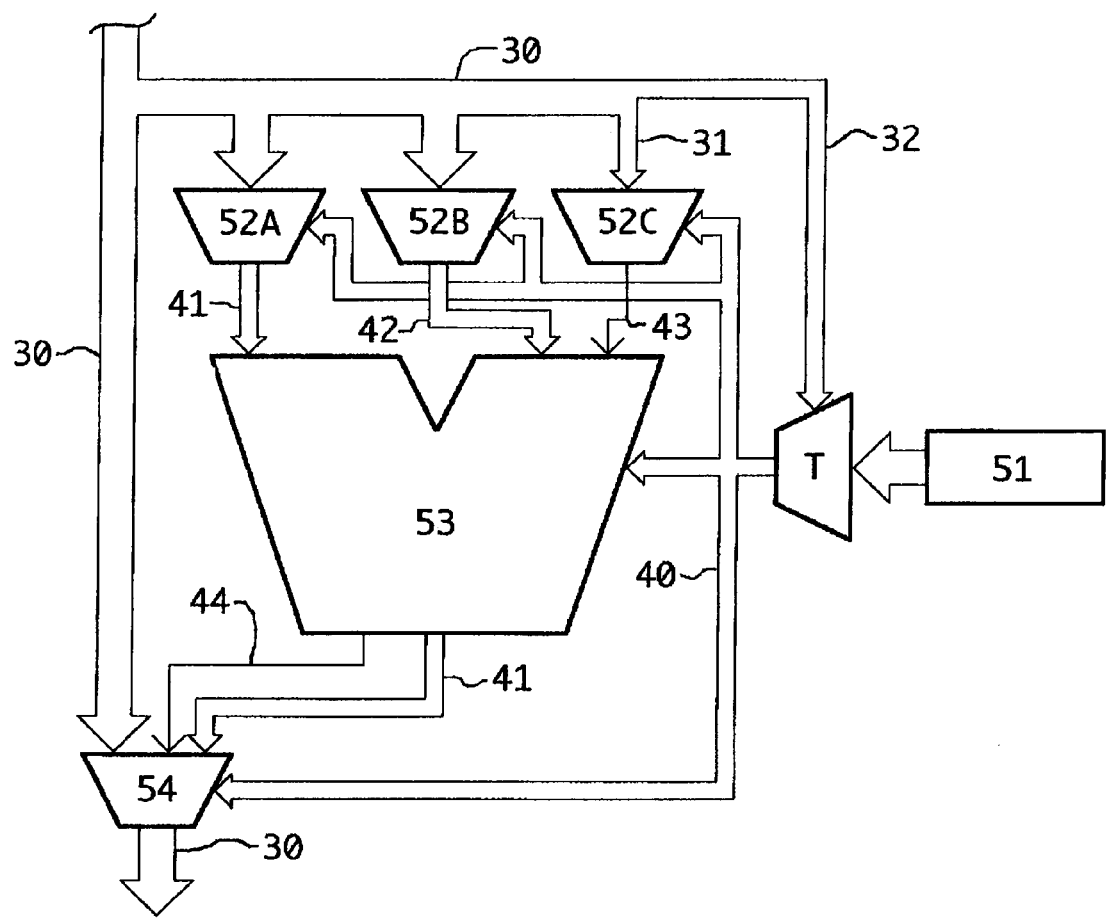
FIG. 3 is a logic diagram of an example embodiment of a programmable logic block, in accordance with the teachings of the present invention.

The Instruction Storage Thread (32) of FIG. 3 is the selector input to the Instruction Storage (51). These special control lines of the Internal Register Bus (30), select a single instruction. The Selected Instruction (40) controls all of the other actions within the corresponding Programmable Logic Block (50).

Each block modifies a selected register from the Internal Register Bus (30), called the Accumulator (41) as indicated in FIG. 3. The Accumulator (41) serves as both an input and an output. This register is selected by the corresponding Data Selectors (52); processed by the corresponding Arithmetic Logic Unit (53); and, distributed back on to the Internal Register Bus (30) by the corresponding Data Distributors (54) for subsequent blocks and final output.

A second set of data is mathematically combined with the Accumulator (41). The Second Source (42), of FIG. 3, is selected by the corresponding Data Selectors (52) and is processed with the Accumulator (41) by the corresponding Arithmetic Logic Unit (53).

One more bit is involved and processed with the Second Source (42) and the Accumulator (41). A Carry Input Line (43), of FIG. 3, is selected from the Carry History (31); processed by the corresponding Arithmetic Logic Unit (53); and the Carry Output Line (44) is shifted into the Carry History (31) by the Data Distributor (54).

Only the Carry History (31) and the Accumulator (41) are changed by each block. All other data bypasses the Data Set Selection (52) and the Arithmetic Logic Unit (53) circuitry. All of the data, including the Accumulator (41) and Carry History (31), must pass through a plurality of two-to-one-multiplexers (54) for each Programmable Logic Block (50) in the Programmable Arithmetic Logic Unit Cluster. When the data pathways permit, the Programmable Arithmetic Logic Unit Cluster will process in parallel. This is possible mostly because of the Internal Register Bus (30).

The Internal Register Bus (30) is assembled from the Input Register File (71) as shown in FIG. 1. Flip-flops hold the input data for the Input Register File (71). The flip-flops are a two dimensional array. The first dimension is the bits in each register. The second dimension is the registers themselves. Included among the registers is the Carry History (31) and the Instruction Storage Thread (32).

The Carry History (31), of FIG. 3, is a set of lines on the Internal Register Bus (30). These special lines work as if they were a shift register. The Carry History (31) contain the carry output data from prior Programmable Logic Blocks (50).

Also, contained on the Internal Register Bus (30) is the Instruction Storage Thread (32) as shown in FIG. 3. The Instruction Storage Thread (32) are the control lines for selecting an instruction for the corresponding Programmable Logic Block (50) from the corresponding Instruction Storage (51).

The Internal Register Bus (30) gets its initial input data from the Input Register File (71) as shown in FIG. 1. The Internal Register Bus (30) contains all of the input data for the system.

The number of registers in the Input Register File (71) of FIG. 1, can be any positive power of two. I will call the number of the power of two registers "R." Thus, R=3 denotes eight registers, R=4 denotes sixteen registers, R=5 denotes thirty-two registers, and R=6 denotes sixty-four registers. Thus, R can be 1, 2, 3, 4, 5, 6, 7, 8, 9 or 10.

I will call the number of bits in each register "X". All the registers in the Input Register File (71) have the same number of bits. The number of bits contained in each of the registers can be any positive integer equal to or greater then two. Thus X can be any value from two to one thousand twenty-four; or even sixty-one. But, this number of bits in the registers must remain the same for all the registers in the Input Register File (71), the Output Register File (79), and the Internal Register Bus (30).

The $X*2R$ bits of the Input Register File (71) are organized into X like valued columns having 2R bits in each column and placed onto the Internal Register Bus (30). After the data has been organized into the Internal Register Bus (30); the data encounters the Programmable Logic Blocks (50) in the cluster. Each and every block has three main jobs, select the input data, process the data, distribute the output. All three of these jobs are dictated by the Selected Instruction (40), as shown in FIG. 3, of the corresponding Instruction Storage (51) within the block.

The number of Programmable Logic Blocks (50) of FIG. 1 in the present invention is a plurality "U"; where U is any positive integer greater than or equal to two. More blocks increase the functionality of the device. Increasing the number of blocks, increases the number of transistors on par for the cluster; therefore, doubling the number of Programmable Logic Blocks (50) is an excellent way of expanding the Programmable Arithmetic Logic Unit Cluster.

The number of instructions contained in each Instruction Storage (51) for each of the corresponding Programmable Logic Blocks (50) can be any non-negative integer power of two "2P"; where P is a whole number equal to or greater than zero. This is a very efficient means for expanding the utility of the Programmable Arithmetic Logic Unit Cluster. Doubling the number of instructions greatly expands the library of functionality for the cluster and at the same time adding less than double the number of transistors.

Therefore, the Programmable Arithmetic Logic Unit Cluster is expandable on at least four independent dimensions. The first dimension is the number of registers. The number of registers (2R) can be any positive integer power of two. The second dimension is the number of bits in each register. The number of bits (X) in each register can be any positive integer that is two or greater. The third dimension is the number of units in the cluster. The number of units (U) in the cluster will also be any positive integer that is two or greater. This invention can be expanded by a fourth independent dimension. The fourth dimension is the number of instructions (2P) where P can be any non-negative integer including zero in the Instruction Storage (51) for each block.

If multiple instructions are assigned to a single Programmable Logic Block (50), then this opens the possibility of complex conditional processing. One or more bits from the Internal Register Bus (30) can be used to select the instruction (32) as shown in FIG. 3. This allows the process to change in the middle of the algorithm dependent on the input or processed data.

Selecting the input data can be accomplished by multiplexers also known as data selectors. The number of data inputs of the multiplexers corresponds to the number of registers (2R). R also denotes the number of selector lines of the multiplexers. The selector lines of the multiplexers are provided by the Selected Instruction (40) of FIG. 3 from the Instruction Storage Thread (32) as shown in FIG. 3. The number of multiplexers corresponds to the number of bits (X) contained in each of the registers.

This method of data selection can be applied to the Internal Register Bus (30) to select the Accumulator Data Set (41) of FIG. 3. A Second Data Set (42) can also be selected in this way. The Carry Input Line (43) is selected by the Data Selector (52) from the Carry History (31) or is forced to be zero. All three sources, the Accumulator Data Set (41) and the Second Data Set (42) and the Carry Input Line (43), are all selected by Data Selectors (52) as specified by the Selected Instruction (40) by the corresponding Instruction Storage Thread (32).

After the data has been selected the next step is to process the data. An arithmetic logic unit of a type that functions without a clock, has a large number of unique and useful functions, and can be made with very few transistors, is preferred.

Processing data without a clock is an advantage in this device mainly because faster processes will process data faster and slower processes use precisely the amount of time necessary to function correctly. In other words, combinational logic will perform better then sequential logic because the process is given exactly the amount of time needed.

An arithmetic logic unit featuring high functionality is desirable. Having a large number of useful functions is a positive attribute because more can be accomplished with fewer units.

An arithmetic logic unit created with a small number of transistors is a positive attribute. This is due to the fact that many arithmetic logic units are necessary for making a practical cluster. Fewer transistors is a good quality because more arithmetic logic units can be constructed at a lower cost.

The selected data has been processed by the Arithmetic Logic Unit (53) for the Selected Instruction (40) of FIG. 3. Now is the time for the outputs of the math unit to be distributed by the data distributors (54). The accumulator is so named because it is the specification for both input data and output data. The output data for the Arithmetic Logic Unit (53) must go onto the Internal Register Bus (30) in the place where the Accumulator (41) input data has been specified by the corresponding Selected Instruction (40). A data distributor having the number of data outputs corresponding to the number of registers in the Input Register File (71) is to be used. The outputs of the data distributor are all high except one. The low output of the Data Distributor (54) will correspond to the Accumulator (41) register specification. The outputs of the Data Distributor (54) become the selector line input of two-to-one-multiplexers. When the selector line is low of the two-to-one-multiplexers, the output data from the Arithmetic Logic Unit (53) is placed onto the Internal Register Bus (30); otherwise, when the selector line of the other two-to-one-multiplexers are high the data of the Internal Register Bus (30) is selected and passes through the multiplexers unaffected.

The same process occurs through each Programmable Logic Block (50) in the cluster. Input data is selected by the Data Selectors (52). The input data is processed by the Arithmetic Logic Unit (53). The output data is distributed by the Data Distributors (54). Although, the math units are in a liner sequence; the uninfluenced data only passes through a two-to-one-multiplexer as a data input. This allows the blocks in the cluster to process their data in parallel when the data path is parallel and sequential only when necessary.

The Programmable Logic Blocks (50) in the cluster monitor their power usage. When the power usage obtains a low and steady state the Programmable Logic Block (50) changes the Power Consumption Indicator (92) of FIG. 2 and the Power Sluing Detector (93) of FIG. 2 from low to high. A low on these lines indicates the block has gates in a transitioning state. A high on these lines indicates the block has finished it's process.

Figure 2:
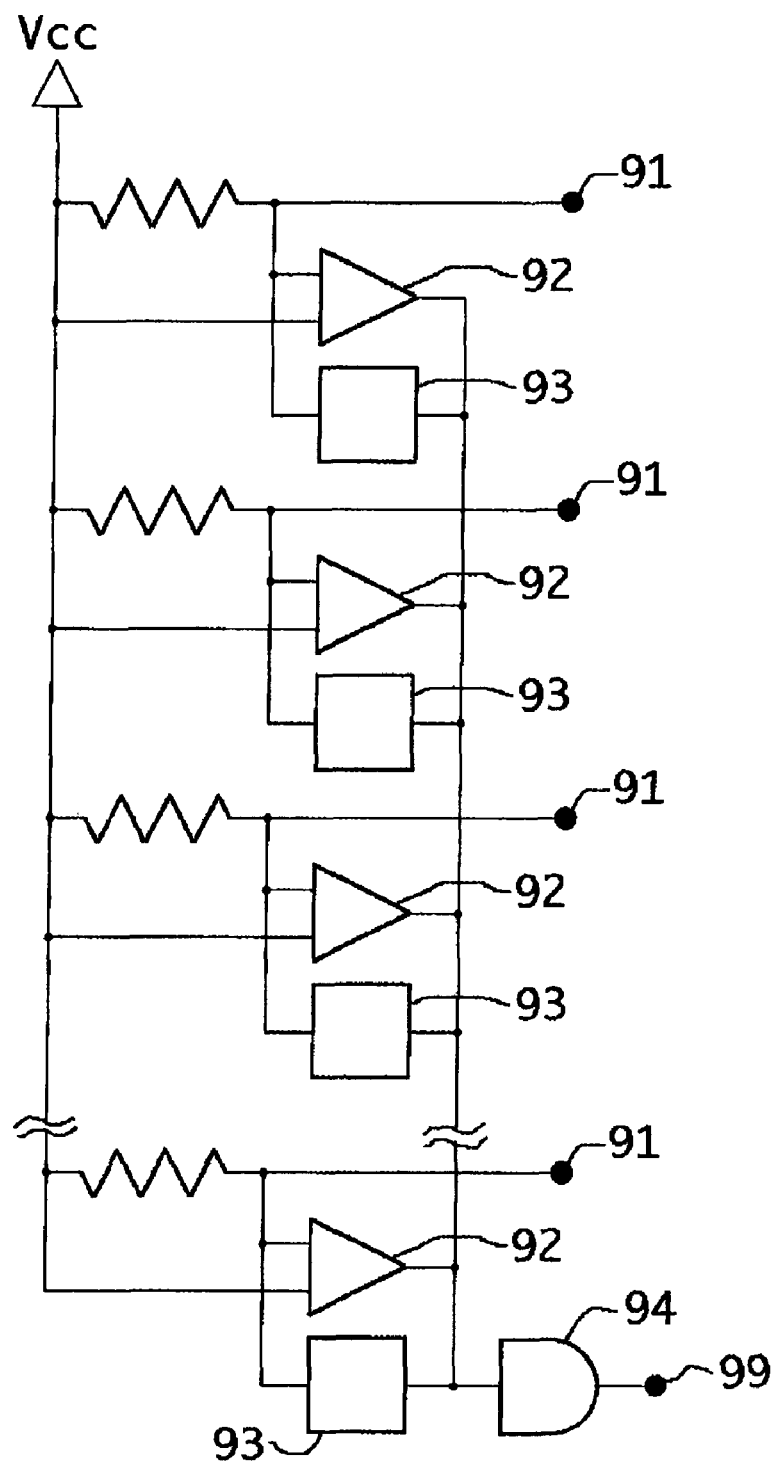
FIG. 2 is a schematic illustration of a power supply monitoring system, in accordance with the teachings of the present invention.

The Power Consumption Indicators (92) of FIG. 2 and the Power Sluing Detectors (93) of FIG. 2 are passed to the Process Finished AND Gate (94) also of FIG. 2. The output from the Processed Finished AND Gate (94) is the Process Finished Indicator (99). The Process Finished Indicator (99) will go from low to high when all the blocks in the cluster are idle. During this transition the Internal Register Bus (30) is latched into the Output Register File (79).

DETAILED DESCRIPTION

Operation

The Programmable Arithmetic Logic Unit Cluster is a passive data processing resource. A passive digital device can benefit from an External Bus Manager (10). The External Bus Manager (10) can be a microprocessor or stack or memory mover. The External Bus Manager (10) controls the external address, data, and control lines.

The External Bus Manager (10) programs each Instruction Storage (51) with a process to implement. Next the External Bus Manager (10) passes input data for processing to the Input Register File (71) of FIG. 1. The Input Register File (71) of FIG. 1 also contains a Carry History (31) of FIG. 3 and an Instruction Storage Thread (32) also of FIG. 3.

All of the data in the Input Register File (71) of FIG. 1 goes on the Internal Register Bus (30). The Internal Register Bus (30) contains all the current variable data for the cluster. The current variable data includes the Carry History (31) and the Instruction Storage Thread (32). The Internal Register Bus (30) is conducted to the Programmable Logic Blocks (50).

The Instruction Storage Thread (32) as shown in FIG. 3, selects an instruction from the Instruction Storage (51). The Selected Instruction (40) dictates all of the remaining actions taken by the corresponding Programmable Logic Block (SO). The Selected Instruction (40) specifies the Accumulator (41) and the Second Source (42). The Accumulator (41) and the Second Source (42) are selected from the Internal Register Bus (30). Also on the Internal Register Bus (30) is the Carry History (31). The Carry Input Line (43) is selected from the Carry History (31).

The Accumulator (41), the Second Source (42), and the Carry Input Line (43) are processed in the Arithmetic Logic Unit (53). The output of the Arithmetic Logic Unit is distributed back on the Internal Register Bus (30) by the Data Distributor (54). The output goes back on the Internal Register Bus (30) where the Accumulator (41) has been specified. The Carry Output Line (44) is, also, distributed onto the Internal Register Bus (30) by the Data Distributor (54). The Carry Output Line (44) is shifted into the Carry History (31). The output data is distributed onto the Internal Register Bus (30) by the Data Distributor (54) for subsequent blocks and final output.

The Programmable Logic Block's (50) power usage is monitored by a Power Consumption Indicator (92) as shown in FIG. 2. The Power Consumption Indicator (92) outputs false when the corresponding block has high power usage and true when the power usage is low. The block's power usage is also checked for changes. When the block's usage is increasing the Power Sluing Detector (93) outputs false. When the block's power usage is decreasing the Power Sluing Detector (93) outputs true. When the detector and the indicator both output true the block has finished processing.

A Process Finished AND Gate (94) has as it's input, the detectors and the indicators from all of the cluster. The output from the Process Finished AND Gate (94) is the Process Finished Indicator (99). The Process Finished Indicator (99) outputs false when there are transistors in a transitioning state. The Process Finished Indicator (99) outputs true when the cluster is idle.

When the cluster is idle the Internal Register Bus (30) is latched into the Output Register File (79) of FIG. 1. The Output Register File (79) holds the system's output data for the External Bus Manager (10), also of FIG. 1, to collect. After the manager has collected the output data, the cluster can be loaded with new input data. Also, the cluster can be reprogrammed with a new algorithm at this point.

The Programmable Arithmetic Logic Unit Cluster is a complex mathematical calculation resource. This device is expandable on four independent dimensions. This arithmetic logic unit cluster is programmed in the way a microprocessor is programmed. When the data pathways are independent the data is processed in parallel.

One embodiment could be R=3, X=16, U=127, and P=8. This would make a machine having 8 registers (2R), each register having 16 bits (X=16), 127 Programmable Logic Blocks (50) (U=127) each block having 256 instructions (2P) in the Instruction Storage (51). This machine would have 128 lines (X*2R) on the Internal Register Bus (30).

A second embodiment is R=4, X=32, U=255, and P=16. This would be an array having 16 registers (2R), each register having 32 bits (X=32), 255 Programmable Logic Blocks (50) (U=255) each block having 65,536 instructions (2P) in the Instruction Storage (51). This array would have 512 lines (X*2R) on the Internal Register Bus (30).

Yet another embodiment is R=6, X=64, U=1023, and P=20. This would create a device having 64 registers (2R), each register having 64 bits (X=64), 1023 units (50) (U=1023), each unit having 1,048,576 instructions (2P) in the Instruction Storage (51). This device would have 4,096 lines (X*2R) on the Internal Register Bus (30).

Although the present invention has been described by way of example with references to the drawings, it is to be noted herein that various changes and modifications will be apparent to those skilled in the art. Therefore, unless such changes and modifications depart from the scope of the present invention, they should be construed as being included therein.

The invention claimed is:

1. A data processor, comprising:
an input register file;
an internal register bus coupled to the input register file;
a plurality of programmable logic blocks (PLBs) coupled to the internal register bus; and
an output register file blocks coupled to the internal register bus,
wherein the internal register bus includes an instruction thread portion and a carry history portion,
a plurality of PLBs, wherein each PLB includes:
an accumulator, selectively coupled to the internal register bus;
a secondary source, selectively coupled to the internal register bus;
a carry history register selectively coupled to the carry history portion;
an instruction selector coupled to the instruction thread portion;
an instruction storage selectively coupled to the instruction selector;
an arithmetic logic unit,
a selected instruction bus coupled to the accumulator, the secondary source, the carry history register, and the arithmetic logic unit,
one of a plurality of two-to-one multiplexers or a data distributor, coupled to the internal register bus, the selected instruction bus, and the accumulator, and
a carry output coupled to the arithmetic logic unit, the one of a plurality of two-to-one multiplexers or a data distributor, and a carry history register.

2. The data processor of claim 1, wherein a selected instruction modifies an instruction storage thread to perform a complex branching algorithm.

3. The data processor of claim 1, further comprising a Programmable Arithmetic Logic Unit Cluster having at least two structural dimensions, wherein the first of at least two structural dimensions is a number of PLBs in the Programmable Arithmetic Logic Unit Cluster, the first of at least two structural dimensions corresponding to one of or a multiple of a prime number between two and nineteen.

4. The data processor of claim 3, further comprising:
a predetermined number of registers in the PLB, wherein the second of at least two structural dimensions corresponds to the predetermined number of registers, and wherein the predetermined number corresponds to a positive, integer, power-of-two.

5. The data processor of claim 1, further comprising:
at least two structural dimensions corresponding to a PLB, wherein one of the at least two structural dimensions is a predetermined number of registers in the PLB, wherein the predetermined number of registers corresponds to a positive, integer, power-of-two.

6. The data processor of claim 1, further comprising:
at least two structural dimensions corresponding to the PLB, wherein one of the at least two structural dimensions is a predetermined number of data bit locations within a register corresponding to one of or a multiple of a prime number between two and nineteen.

7. The data processor of claim 1, further comprising:
at least two structural dimensions corresponding to the PLB, wherein one of the at least two structural dimensions is a predetermined number of constrained linear instructions for each PLB corresponding to a positive, integer, power-of-two.

8. The data processor of claim 1, further comprising:
at least two structural dimensions corresponding to the PLB,
wherein a first dimension of the at least two structural dimensions is a first predetermined number of PLBs in a Programmable Arithmetic Logic Unit Cluster corresponding to one of or a multiple of a prime number between two and nineteen,
wherein a second structural dimension of the at least two structural dimensions is a second predetermined number of registers corresponding to a positive, integer, power-of-two,
wherein a third structural dimension of the at least two structural dimensions is a third predetermined number of data bit locations within a register corresponding to one of or a multiple of a prime number between two and nineteen; and
wherein a fourth structural dimension of the at least two structural dimensions is a fourth predetermined number of constrained linear instructions for each PLB, and the fourth predetermined number of constrained linear instructions corresponds to a positive, integer, power-of-two.

9. The data processor of claim 8, wherein:
the first predetermined number comprises 256;
the second predetermined number comprises 16;
the third predetermined number comprises 64; and
the fourth predetermined number is 256.

10. The data processor of claim 8, wherein:
the first predetermined number comprises 32;
the second predetermined number comprises 32;
the third predetermined number comprises 32;
and the fourth predetermined number is 32.

11. A data processor, comprising:
a register including data;
a bus coupled to the register;
a plurality of programmable logic blocks (PLBs) coupled to the bus,
wherein the plurality of programmable logic blocks (PLBs) is defined over plural dimensions; and
an instruction cache coupled to a PLB and including constrained linear instruction sequences operable on the PLB and configured to receive the data from the register, or to perform a defined function on the data,
wherein the constrained linear instruction sequences produce no feedback loop,
wherein the number of constrained linear instruction sequences for each PLB comprises a first dimension corresponding to a first positive, integer, power-of-two number;
wherein the number of PLBs in the plurality comprises a second dimension corresponding to a first inclusive one of or a multiple of a prime number between two and nineteen;
wherein the number of registers in a PLB comprises a third dimension corresponding to a second positive, integer, power-of-two number, and
wherein the number data bit locations in a register comprises a fourth dimension corresponding to a second inclusive one of or a multiple of a prime number between two and nineteen.

12. The data processor of claim 11, wherein the PLB further comprises asynchronous logic elements configured to operate on the data.

13. The data processor of claim 11, further comprising:
the first dimension corresponding to at least 32 PLBs;
the second dimension corresponding to at least 32 instructions for each of the PLBs;
the third dimension corresponding to at least 32 registers; and
the fourth dimension corresponding to at least 32 data bit locations in each register.

* * * * *